United States Patent [19]
Jackowski et al.

[11] Patent Number: 6,141,686
[45] Date of Patent: Oct. 31, 2000

[54] CLIENT-SIDE APPLICATION-CLASSIFIER GATHERING NETWORK-TRAFFIC STATISTICS AND APPLICATION AND USER NAMES USING EXTENSIBLE-SERVICE PROVIDER PLUGIN FOR POLICY-BASED NETWORK CONTROL

[75] Inventors: Steven J. Jackowski, Santa Cruz; Christopher N. Thomas, Soquel, both of Calif.

[73] Assignee: Deterministic Networks, Inc., Santa Cruz, Calif.

[21] Appl. No.: 09/103,339

[22] Filed: Jun. 23, 1998

Related U.S. Application Data

[63] Continuation-in-part of application No. 09/042,306, Mar. 13, 1998.

[51] Int. Cl.[7] .............................. G06F 13/38; G06F 15/17
[52] U.S. Cl. .................. 709/224; 709/105; 709/229; 709/206; 709/301; 709/302
[58] Field of Search ..................... 709/224, 226, 709/229, 104, 105, 301, 302, 304, 238, 206, 207, 103, 249; 710/10; 370/252, 254

[56] References Cited

U.S. PATENT DOCUMENTS

| | | | |
|---|---|---|---|
| 5,136,581 | 8/1992 | Meuhrcke ................................ 370/62 |
| 5,341,477 | 8/1994 | Pitkin et al. ............................ 395/200 |
| 5,499,343 | 3/1996 | Pettus ................................... 395/200.2 |
| 5,596,720 | 1/1997 | Hamada et al. ........................ 395/200 |
| 5,621,734 | 4/1997 | Mann et al. ............................ 370/94.1 |
| 5,644,715 | 7/1997 | Baugher ............................... 395/200.2 |
| 5,668,998 | 9/1997 | Mason et al. .......................... 395/701 |
| 5,673,322 | 9/1997 | Pepe et al. ............................. 380/49 |
| 5,674,003 | 10/1997 | Andersen et al. ...................... 364/514 |
| 5,682,478 | 10/1997 | Watson et al. ......................... 395/200 |
| 5,682,482 | 10/1997 | Burt et al. .............................. 395/242 |
| 5,694,548 | 12/1997 | Baugher et al. ....................... 395/200.1 |
| 5,701,484 | 12/1997 | Artsy ..................................... 395/683 |
| 5,732,270 | 3/1998 | Foody et al. ........................... 395/683 |
| 5,802,320 | 9/1998 | Baehr et al. ........................... 709/249 |
| 5,867,667 | 2/1999 | Butman et al. ........................ 709/249 |
| 5,880,740 | 3/1999 | Halliday et al. ....................... 345/435 |
| 5,920,705 | 7/1999 | Lyon et al. ........................... 395/200.7 |
| 5,940,390 | 8/1999 | Berl et al. .............................. 370/389 |
| 5,943,496 | 8/1999 | Li et al. .................................. 395/685 |
| 5,956,721 | 9/1999 | Douceur et al. ........................ 707/10 |
| 5,960,177 | 9/1999 | Tanno ..................................... 395/229 |
| 5,966,531 | 10/1999 | Skeen et al. ........................... 395/683 |
| 5,974,549 | 10/1999 | Golan .................................... 713/200 |
| 5,983,274 | 11/1999 | Hyder et al. ........................... 709/230 |
| 5,987,611 | 11/1999 | Freund .................................. 713/201 |
| 5,991,302 | 11/1999 | Berl et al. .............................. 370/400 |
| 5,991,760 | 11/1999 | Gauvin et al. .......................... 707/10 |
| 6,014,700 | 1/2000 | Bainbridge et al. ................... 709/226 |
| 6,034,964 | 3/2000 | Fukushima et al. ................... 370/401 |
| 6,076,168 | 6/2000 | Fiveash et al. ........................ 713/201 |
| 6,078,953 | 6/2000 | Vaid et al. ............................. 709/223 |

*Primary Examiner*—Le Hien Luu
*Assistant Examiner*—Bunjob Jaroenchonwanit
*Attorney, Agent, or Firm*—Stuart T. Auvinen

[57] ABSTRACT

Low-level network services are provided by network-service-provider plugins. These plugins are controlled by an extensible service provider that is layered above the TCP or other protocol layer but below the Winsock-2 library and API. Policy servers determine priority of network traffic through control points on a network. Examining packets passing through these control points provides limited data such as the source and destination IP address and TCP ports. Many applications on a client machine may use the same IP address and TCP ports, so packet examination is ineffective for prioritizing data from different applications on one client machine. Often some applications such as videoconferencing or data-entry for corporate sales are more important than other applications such as web browsing. A application-classifier plugin to the extensible service provider intercepts network traffic at above the client's TCP/IP stack and associates applications and users with network packets. These associations and statistics such as maximum, average, and instantaneous data rates and start and stop time are consolidated into tables. The policy server can query these tables to find which application is generating network traffic and prioritize the traffic based on the high-level application. Bandwidth-hogging applications such as browsers can be identified from the statistics and given lower priority.

20 Claims, 14 Drawing Sheets

| | TRIGGERING EVENT | OBJECT TYPE | OBJECT NAME |
|---|---|---|---|
| APP | STARTUP<br>CLEANUP | EventAppInit | APPSTART<br>APPSTOP |
| SOCKET | SOCKET_OPEN<br>SOCKET_CLOSE | EventSocketInit | SOCKETOPEN<br>SOCKETCLOSE |
| | BIND_COMPLETE<br>ACCEPT_COMPLETE<br>CONNECT_COMPLETE | EventSocketState | SOCKETBIND<br>SOCKETACCEPT<br>SOCKETCONNECT |
| | RECV_COMPLETE<br>SEND_COMPLETE | EventSocketDataXfer | SOCKETIN<br>SOCKETOUT |
| FLOW | CONNECT_COMPLETE<br>SEND_COMPLETE<br>SOCKET_CLOSE<br>RECV_COMPLETE | EventFlowInit | FLOWSTART<br>FLOWSTART<br>FLOWSTOP |

FIG. 6

Application Open/Close Event

| Index | C Type (VB) | Value | Description |
|---|---|---|---|
| 0 | long (Long) | Version | Version |
| 1 | long (Long) | Time | The time of the event. This is the C time_t value representing the number of seconds since 1/1/70 |
| 2 | long (Long) | ProcessID | The process ID of the application |
| 3 | BSTR (String) | Application Name | The name of the application |
| 4 | BSTR (String) | User Name | The name of the currently logged in user. |

Figure 7A

Socket Open/Close Event

| Index | C Type (VB) | Value | Description |
|---|---|---|---|
| 0 | long (Long) | Version | Version |
| 1 | long (Long) | Time | The time of the event. This is the C time_t value representing the number of seconds since 1/1/70 |
| 2 | long (Long) | ProcessID | The process ID of the application |
| 3 | long (Long) | Socket | The socket ID |
| 4 | long (Long) | Flow ID | The flow ID of the flow associated with this socket |
| 5 | long (Long) | Network Protocol | The network protocol (IP,IPX) associated with this socket. |
| 6 | long (Long) | Transport Protocol | The transport protocol used by the socket. These values may be specific to particular network protocols. |

Figure 7B

Socket Bind/Connect/Accept Event

| Index | C Type (VB) | Value | Description |
|---|---|---|---|
| 0 | long (Long) | Version | Version |
| 1 | long (Long) | Time | The time of the event. This is the C time_t value representing the number of seconds since 1/1/70 |
| 2 | long (Long) | ProcessID | The process ID of the application |
| 3 | long (Long) | Socket | The socket ID |
| 4 | long (Long) | Flow ID | The flow ID of the flow associated with this socket |
| 5 | long (Long) | Local Address | The IP address and port information |
| 6 | long (Long) | Local Port | |
| 7 | long (Long) | Remote Address | The IP address and port information |
| 8 | long (Long) | Remote Port | |

Figure 7C

Flow Table

| Index | C Type (VB) | Value | Description |
|---|---|---|---|
| 0 | long (Long) | Version | Version |
| 1 | long (Long) | Number of Flows | The number of flows in the table |
| 2 | SAFEARRAY of VARIANT | Flows | This is an array of flows, where each flow is a Variant as described in the Figure 9A. |

Figure 9B

Socket Data In/Out Event

| Index | C Type (VB) | Value | Description |
|---|---|---|---|
| 0 | long (Long) | Version | Version |
| 1 | long (Long) | Time | The time of the event. This is the C time_t value representing the number of seconds since 1/1/70 |
| 2 | long (Long) | ProcessID | The process ID of the application |
| 3 | long (Long) | Socket | The socket ID |
| 4 | long (Long) | Flow ID | The flow ID of the flow associated with this socket |
| 5 | long (Long) | Local Address | The IP address and port information |
| 6 | long (Long) | Local Port | |
| 7 | long (Long) | Remote Address | The IP address and port information |
| 8 | long (Long) | Remote Port | |
| 9 | long (Long) | Bytes | The number of bytes sent or received |

Figure 7D

Flow Start/Stop Event

| Index | C Type (VB) | Value | Description |
|---|---|---|---|
| 0 | long (Long) | Version | Version |
| 1 | long (Long) | Time | The time of the event. This is the C time_t value representing the number of seconds since 1/1/70 |
| 2 | long (Long) | ProcessID | The process ID of the application |
| 3 | long (Long) | Flow ID | The flow ID of the flow associated with this socket |
| 4 | BSTR (String) | Application Name | The name of the application |
| 5 | BSTR (String) | User Name | The name of the currently logged in user. |
| 6 | long (Long) | Network Protocol | The network protocol (IP,IPX) associated with this socket. |
| 7 | long (Long) | Transport Protocol | The transport protocol used by the socket. These values may be specific to particular network protocols. |
| 8 | long (Long) | Local Address | The IP address and port information |
| 9 | long (Long) | Local Port | |
| 10 | long (Long) | Remote Address | The IP address and port information |
| 11 | long (Long) | Remote Port | |

Figure 7E

Flow Information

| Index | C Type (VB) | Value | Description |
|---|---|---|---|
| 0 | long (Long) | Version | Version |
| 1 | long (Long) | FlowID | The flow to which the information relates. |
| 2 | long (Long) | ProcessID | The process ID of application generating this flow. |
| 3 | BSTR (String) | Application Name | The name of the application generating this flow |
| 4 | BSTR (String) | User Name | The name of the currently logged in user. |
| 5 | long (Long) | Start time | The time the flow began. |
| 6 | long (Long) | Stop time | The time flow ended. Zero for ongoing flow. |
| 7 | long (Long) | Transport Protocol | Transport protocol. |
| 8 | long (Long) | Net Protocol | Protocol |
| 9 | long (Long) | Source Port | These entries identify the IP address information for the flow. |
| 10 | long (Long) | Source Address | |
| 11 | long (Long) | Destination Port | |
| 12 | long (Long) | Destination Address | |
| 13 | long (Long) | Total Sent | Total bytes sent in this flow |
| 14 | long (Long) | Total Received | Total bytes received in flow |
| 15 | long (Long) | Max Rate | These are the rates for the life of the flow for bytes sent and received. |
| 16 | long (Long) | Min Rate | |
| 17 | long (Long) | Average Rate | |
| 18 | long (Long) | Delta Sent | Total Sent, Total Received and Average Rate, but reset for each query. Delta Rate is calculated over the time between the queries. |
| 19 | long (Long) | Delta Received | |
| 20 | long (Long) | Delta Rate | |

Figure 9A

CLIENT-SIDE APPLICATION-CLASSIFIER GATHERING NETWORK-TRAFFIC STATISTICS AND APPLICATION AND USER NAMES USING EXTENSIBLE-SERVICE PROVIDER PLUGIN FOR POLICY-BASED NETWORK CONTROL

RELATED APPLICATION

This application is a continuation-in-part of the co-pending application for "Ordering of Multiple Plugin Applications Using Extensible Layered Service Provider with Network Traffic Fltering", U.S. Ser. No. 09/042,306, filed Mar. 13, 1998, now pending.

FIELD OF THE INVENTION

This invention relates to software for computer networks, and more particularly to client plugins for identifying application traffic-signatures, signaling traffic priorities, and for generating network statistics for policy servers.

BACKGROUND OF THE INVENTION

Computer networks such as the Internet are driving increased acceptance of personal computers. Network communication began with text-only e-mail and file-transfer protocols (FTP), but with improved user interfaces and graphics, graphical browsing has become commonplace. Mission-critical business transactions, corporate database queries, and even video conferencing and voice telephone calls all use the Internet.

Not surprisingly, the Internet and local networks are becoming crowded. Simply increasing bandwidth is expensive and often only shifts bottlenecks to another part of the network. While users may not notice delayed e-mail, Internet browsing can become painfully slow during times of network congestion. Video conferencing and telephony suffer poor quality and even gaps of lost speech when the network is slow.

FIG. 1 illustrates differing priorities of various kinds of network traffic. Two-way video and audio communications such as video conferencing and Internet telephony must have their packets delivered over the network in real time, or parts of the conversation are lost. Thus these services must have the highest priority in most networks. Business-critical applications such as financial transactions and accesses of corporate databases have moderately high priority. Browser traffic to the world-wide-web has a lower priority since much of this traffic is for information gathering and personal uses. However, browser traffic should not be so slow as to irritate the users. Lowest in priority are file transfers and e-mail, since these are usually not needed immediately.

Server traffic tends to have a higher priority than client traffic, since business-critical applications reside on corporate servers. Clients are usually individual desktop PC's.

Quality-Of-Service Network Policy

Attempts have been made to improve transmission speed of higher-priority traffic. Bandwidth-shaping or traffic-shaping delays low-priority traffic so that higher-priority packets can pass through with less delay. Quality-of-Service (QOS) is thus improved. Bandwidth can be reserved for the highest-priority applications such as video conferencing. See for example, U.S. Pat. Nos. 5,644,715 and 5,694,548, by Baugher et al., assigned to IBM; also U.S. Pat. No. 5,673,322 by Pepe et al., and U.S. Pat. No. 5,136,581 by Muehrchke, assigned to Bell Labs.

Can't Determine Priority of IP Packets—FIG. 2

Ideally, a network device such as a router would read a packet's header and determine the priority of that packet from fields in the header. Unfortunately, determining the priority of packets passing through a network point is problematic. Simple filtering software can be used to identify packets using certain network protocols such as TCP, or certain Internet Protocol (IP) addresses.

FIG. 2 shows an Internet packet. Port fields 23, 24 identify which ports were assigned by the network software for communication with a higher-level application requesting a communications session. Destination port field 23 specifies the port on the destination machine, while source port field 24 specifies the port on the source machine. Protocol 26 is a field identifying the network protocol used, such as TCP or UDP. Destination address field 28 contains the IP address that the packet is being sent to, while source address field 29 contains the IP address of the sender of the packet. The contents or data of the packet, perhaps with additional higher-level headers, is contained in data field 22.

While some applications may use certain ports, many applications use standard ports, such as port 80 for web browsers. Sometimes these ports are dynamically assigned to applications, so that different ports are used by the same application at different times. Simply reading port fields 23, 24 does not uniquely identify applications, so it is difficult to determine priority based on port fields 23, 24. Most applications use the TCP protocol, so protocol field 26 likewise does not uniquely identify users or their applications.

IP address fields 28, 29 often uniquely identify a user or a server machine, and IP-address filtering has been used to restrict access by children to adult-only web sites. IP-address filtering has been less successful for blocking unwanted "junk" or "Spam" e-mail, since the IP-address fields are often altered to hide the originating IP address. Larger web sites may use many IP addresses that may dynamically change as the web site is updated. Even client machines can have dynamically-assigned IP addresses rather than a static IP address. In some organizations, many users share an IP address. Thus determining packet priority using IP addresses is not effective.

Ideally, the names of the high-level application on the client and on the server machines should be collected. The high-level application names could then be uses for prioritizing IP packets from these applications, rather than use IP addresses and TCP ports.

Policy-Controlled Network—FIG. 3

FIG. 3 is a diagram of a network that controls traffic using policy rules. Client PCs 10, 12 send IP packets over local network 15 to corporate server 16 and Internet 20. Edge device 14 is a router, switch, gateway, modem or other network device that connects local network 15 to Internet 20. Traditionally, routers such as edge device 14 have simply passed all packets through roughly in the order received, without regard to priority.

Edge device 14 is able to block or delay packets to and from Internet 20 so that higher-priority packets experience less delay than lower-priority packets. Edge device 14 may examine packets and apply policy rules to determine which packets to accelerate and which to delay.

Policy server 18 sends the policy rules to edge device 14. Bandwidth information is sent back from edge device 14 to policy server 18. This bandwidth information might indicate the current bandwidth available to Internet 20 or local network 15, or other traffic or load statistics such as the kinds of packets appearing. The bandwidth information may be used by policy server 18 to re-prioritize packets passing through edge device 14 by adjusting the policy rules sent to edge device 14. For example, when edge device 14 detects video conferencing packets passing through, policy server 18 can reduce the bandwidth allocated to other kinds of packets to reserve additional network bandwidth for video-conferencing packets.

Often higher-priority packets are generated by corporate server 16 than client PCs 10, 12. Policy server 18 can set a higher-priority policy for corporate server 16 when certain kinds of packets appear in the bandwidth information from edge device 14.

While such a policy-controlled network is effective, newer technologies make determining the priority of packets more difficult. Low-priority web browsing from client 10 can be identified by the IP address for client 10 and port 80 used by the browser. However, newer software installed on client PC 12 dynamically assigns ports to applications. IP addresses may also be changed using Dynamic Host Configuration Protocol (DHCP). The application may appear as port 50 one day, but port 22 on another day. The IP address assigned to client PC 12 may also be dynamically assigned or even shared by other client PCs.

Identifying web browser traffic from client PC 12 is thus quite difficult. Client PC 12 could be downloading huge graphics images from the Hubbell Space Telescope for personal use, swamping the capacity of the network, while client 10 waits to read text-based information from an important customer over Internet 20. Network chaos erupts when even a few users hog bandwidth for low-priority tasks.

Security software may encrypt packets. Encryption may include the source IP address and port, preventing other devices and servers from reading the source address of packets.

Extensible Service Provider Accepts Network-Service Plugins—FIG. 4

The parent application, U.S. Ser. No. 09/042,306, hereby incorporated by reference, discloses in detail an extensible service provider that manages and orders network-service plugins. FIG. 4 is a diagram of a network architecture using an extensible service provider that manages and orders network-service plugins. The architecture is based on Winsock-2, the second-generation network architecture for Microsoft's Windows operating systems. Winsock-2 provides connections or "sockets" for high-level applications to connect to a network. A socket is the identifier for a given connection, or for a connectionless data-gram flow.

High-level applications 32 send and receive information to a network by making calls to Winsock-2 library 34. Winsock-1 calls from high-level applications are also routed through in a similar fashion. These calls use an applications-programming interface (API) that defines the function calls and their syntax. Winsock-2 library 34 is a dynamic-link library (DLL) of these function calls and other network-support routines.

Earlier versions of Winsock communicated directly with the lower TCP layer 40, which provides a Transmission Control Protocol for establishing sessions with remote hosts over a network. TCP layer 40 sends data to IP layer 42, which splits the data into Internet-Protocol IP packets and adds header information such as the source and destination IP address. IP layer 42 sends and receives these IP packets to the network media using physical layers such as a media-access controller (MAC).

While direct communication from Winsock-2 library 34 to TCP layer 40 can occur, Winsock-2 provides a service-provider interface (SPI) to third-party software modules known as layered providers or layered service providers. Instead of having many layered providers all communicating with TCP layer 40, a single extensible service provider 50 is installed. Extensible service provider 50 intercepts all network traffic at a lower level than the applications. Extensible service provider 50 fits between Winsock-2 library 34 and TCP layer 40, operating on data sent from Winsock-2 library 34 to TCP layer 40 for transmission. Extensible service provider 50 is "extensible" since it allows for the expansion of network services.

Extensible service provider 50 manages or controls the execution of additional network services provided by plugins 52. Plugins 52 are reduced in size and complexity compared with layered service providers because overhead functions and filtering is performed for all plugins by extensible service provider 50.

Plugins 52 provide various extra network services such as encryption, compression, security, proxies, or re-routing. These network services are transparent to high level applications 32 and can be activated for all applications using the network. Extensible service provider supplies a framework for managing and ordering a wide variety of plugin services.

Policy servers are desirable for prioritizing and regulating network traffic. Policy servers can better prioritize IP packets when the originating application and user are known. Although IP packets do not identify the high-level application or user that sent the data, this information is useful to policy servers. It is desired to collect information such as the originating application and user from client and server machines that can be used by the policy server in making priority decisions.

However, information must be collected from the client and server machines in a manner that is transparent to high-level applications. It is desired to install plugins on client and server machines that can be queried by the policy server. A specialized plugin for the extensible service provider is desired that monitors and collects information on network traffic from a client or server. This information includes the originating and destination high-level applications, data rates, and users. It is desired to prioritize network traffic based on high-level applications and users rather than low-level IP addresses and TCP ports.

SUMMARY OF THE INVENTION

A client-side application-classifier has an upper interface to a higher-level network-socket library. The higher-level network-socket library provides high-level network functions to high-level user applications by generating a socket for connecting to a remote machine on a network. A lower interface is to a network-transport layer that formats data for transmission over the network. An interceptor is coupled between the upper and lower interfaces. It intercepts network events.

An examiner is coupled to the interceptor. It examines the network event intercepted and collects statistical information about the network event. The statistical information includes:

an application name of one of the high-level user applications that caused the network event;

a timestamp for the network event;

a byte count when the network event is a transfer of data over the network;

Internet addresses and ports when the network event is a connection or a data transfer; and a process identifier of a running instance of the high-level user application.

A consolidator is coupled to the examiner. It consolidates the statistical information into application-classifier tables. The application-classifier tables include current tables for currently-running instances of applications, and historical tables that include closed applications. A reporter is coupled to the consolidator. It sends the statistical information from the application-classifier tables to a remote policy server on the network. The statistical information includes the application name. Thus the statistical information for network events is collected by the client-side application-classifier.

In further aspects of the invention the interceptor is an extensible service provider and the examiner is an application-classifier plugin to the extensible service provider. The extensible service provider controls other plugins providing low-level network services.

In still further aspects the examiner generates an event object containing the statistical information. The event object is sent to the consolidator and written into the application-classifier tables. The network event is:

an application startup event when a high-level application is initialized;

an application cleanup event when the high-level application is terminated;

a socket open event when a new socket is opened;

a socket close event when a socket is closed;

a connect event when a connection is made from a client to a remote server;

an accept event when a connection is accepted from a remote client;

a send-complete event when a flow of data has been sent from the client to the remote server; and a receive-complete event when a flow of data has been sent from the remote server to the client.

In further aspects the statistical information for all network events includes a process identifier. The application-classifier tables are indexed by the process identifier. The application-classifier tables store for each flow of each high-level application:

the process identifier;

the timestamp;

the application name;

the byte count when the network event is a transfer of data over the network; and Internet addresses and ports when the network event is a connection or a data transfer;

and wherein an application-classifier table for a high-level application contains:

maximum, average, and most-recent data-transfer rates for flows generated by the high-level application.

In other aspects the network-transport layer is a TCP/IP data communications stack coupled to a first network through a first media-access control (MAC) adapter and coupled to a second network through a second MAC adapter. The client-side application-classifier also has a network enhancer that is coupled between the network-transport layer and the first and second media-access controllers. It intercepts network packets and extracts routing information including source and destination network addresses.

A route table is coupled to the network enhancer to store the routing information for the network packets. The examiner is coupled to the route table to determine a source address of either the first MAC adapter or of the second MAC adapter or other MAC adapters when the source address is not available from the upper interface. Thus source addresses for clients with two network connections is obtained by the network enhancer below the TCP/IP stack.

BRIEF DESCRIPTION OF THE DRAWINGS

FIG. 6 is a table of events that trigger the application-classifier plugin to send data objects to the controller for classification.

FIGS. 7A–7E show definitions for objects that transfer data about network events from the application-classifier plugin to the controller for classification and storage.

FIGS. 9A, 9B are diagrams of the format of an entry in the consolidator's tables.

DETAILED DESCRIPTION

Figure 1:
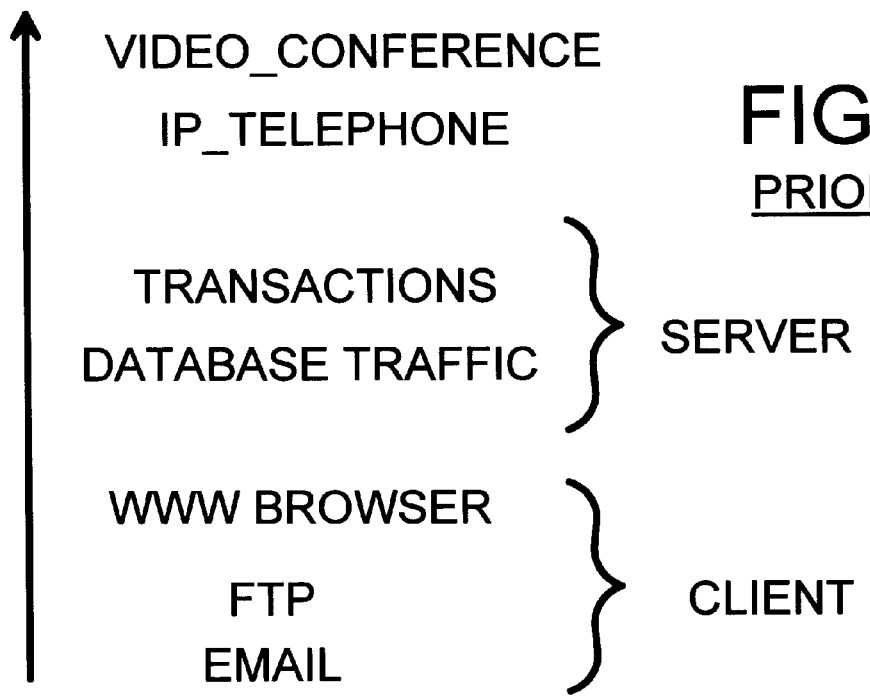
FIG. 1 illustrates differing priorities of various kinds of network traffic.
Figure 2:
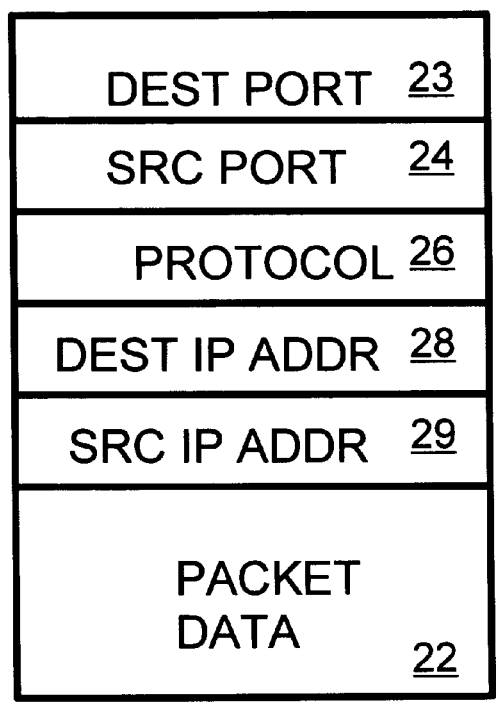
FIG. 2 shows an Internet packet.
Figure 3:
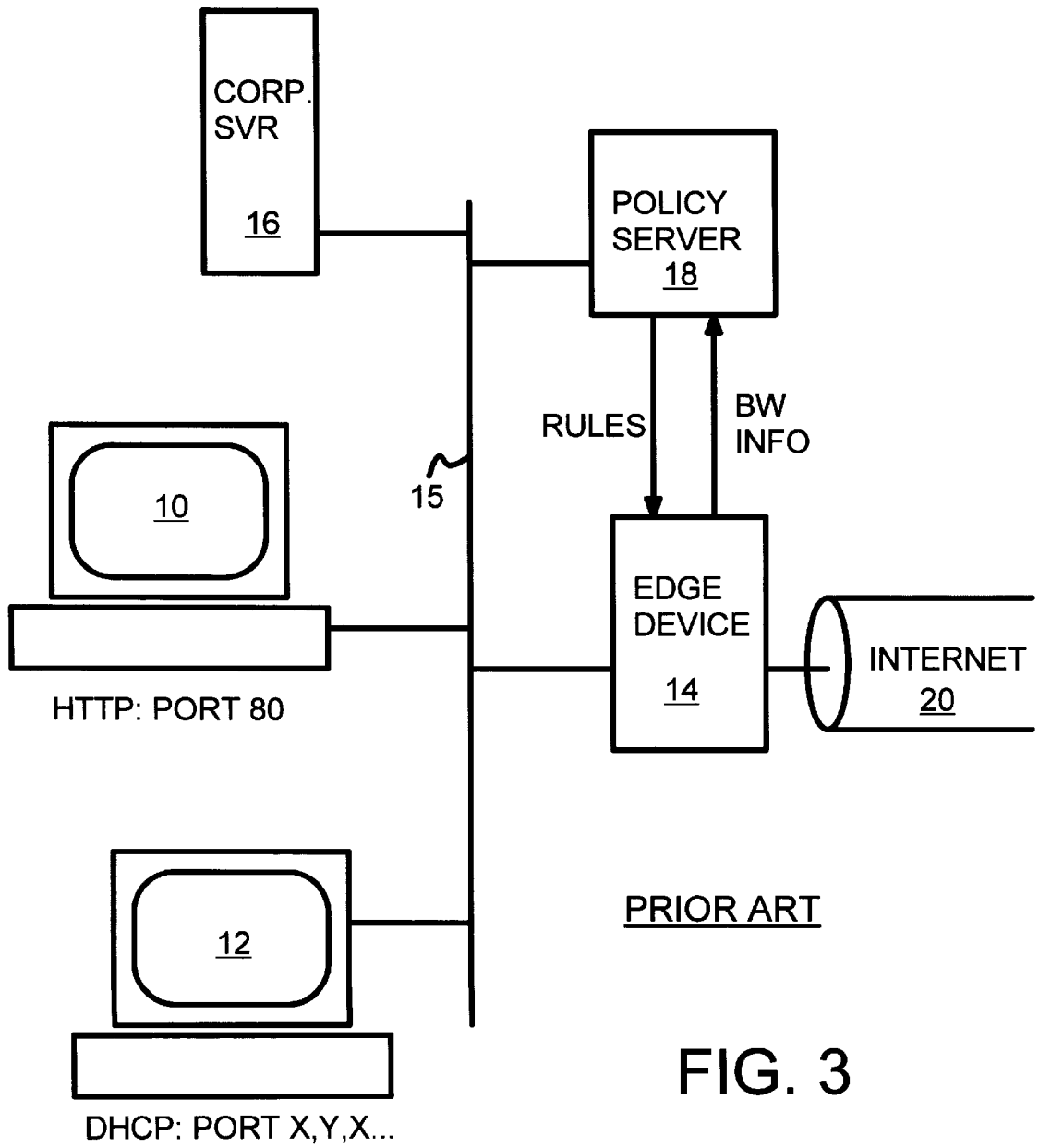
FIG. 3 is a diagram of a network that controls traffic using policy rules.
Figure 4:
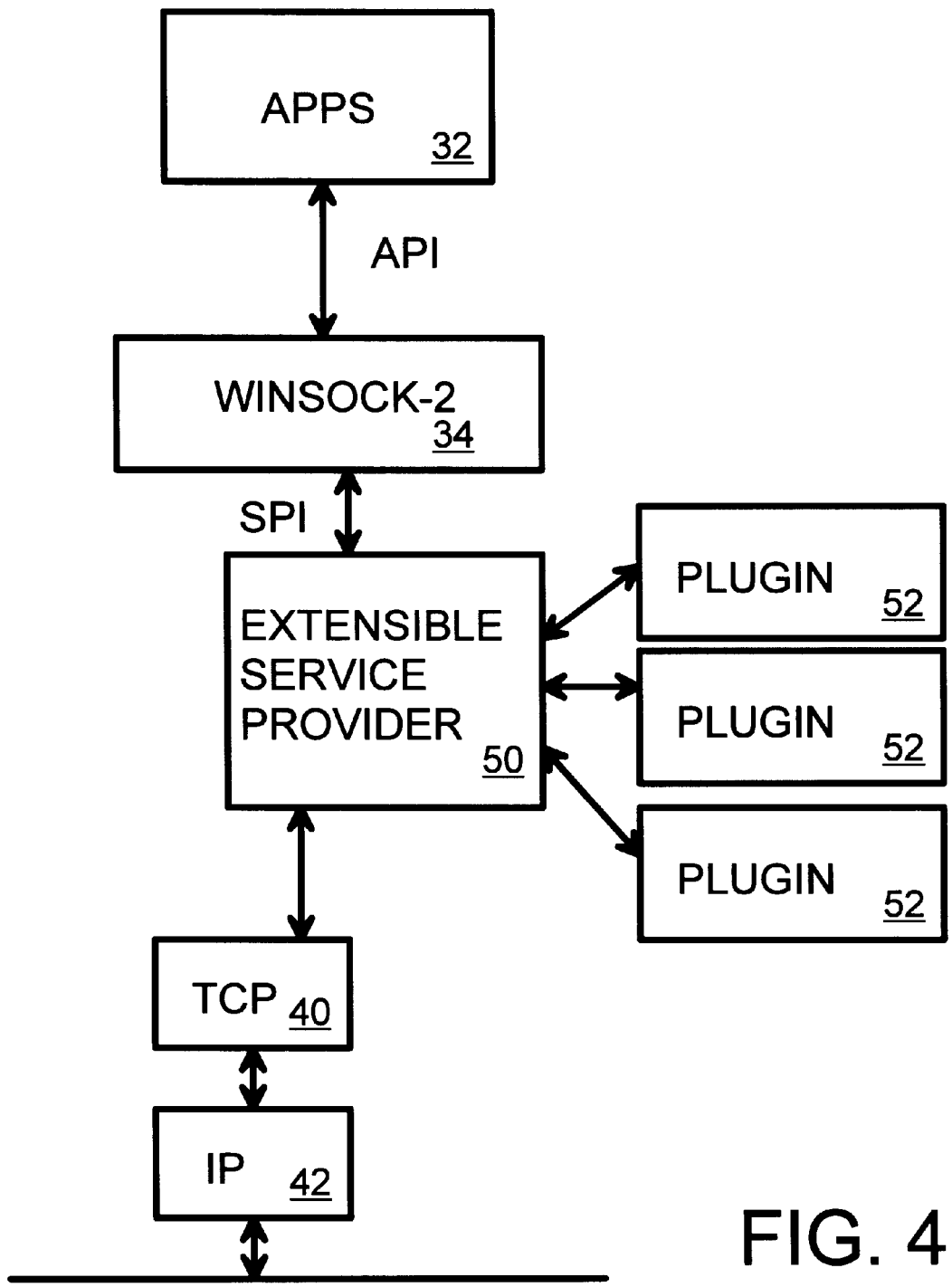
FIG. 4 is a diagram of a network architecture using an extensible service provider that manages and orders network-service plugins.

The present invention relates to an improvement in network policy servers and their clients. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

High-Level Better Than Low-Level for Prioritization

The inventors have realized that policy servers typically prioritize network traffic based on low-level IP addresses and TCP ports. Low-level prioritization is undesirable because IP addresses and TCP ports are often shared by many applications and users. All applications and users sharing IP addresses and ports would be given the same priority. Even when IP addresses are statically assigned to one machine, all applications on that machine may need to be given the same priority, even though some applications are inherently more important than others.

Ideally, a user is given high priority when using corporate applications such as client databases and sales forms, but lower priority when using personal, non-business applications such as web browsing or graphics downloading. This requires that the names of the high-level applications and users be used for prioritizing network traffic, not just the IP addresses and TCP ports.

The names of the high-level application and its users on the client and on the server machines can be collected using the invention. The high-level application names are then used by a policy server to prioritize IP packets from these applications, rather than only use IP addresses and TCP ports. The high-level application and user names are then associated with a traffic signature. The traffic signature is a unique representation of the user's application network traffic which can include the IP address, TCP port, and some of the data in the packets. Packets matching the traffic signature can then be identified at various points in a network and acted upon. Thus network traffic is prioritized by user and application, rather than by machine.

Since a policy server cannot consistently identify a high-level application by examining the IP packets passed through the network, the invention identifies network traffic by application and user. A software module on client or server machines collects information on network traffic from each client or server. A plugin for the extensible service provider on a client or server machine collect statistics on network traffic that can be read by a policy server. The collected statistics are arranged by user and high-level application and include data rates and time stamps.

Current Invention is a Plugin Module for ESP of Parent Application

The parent application, U.S. Ser. No. 09/042,306, hereby incorporated by reference, discloses in detail an extensible service provider (ESP) that manages and orders network-service plugins. The current invention includes a plugin module for the extensible service provider described in the parent application. This plugin module is used to collect network-traffic statistics and identify traffic signatures for applications. Since the traffic signatures collected include the name of the high-level application, the plugin is known as an application-classifier engine (ACE) plugin.

The application-classifier plugin resides on client and/or server machines and each collects network statistics for packets originating from or received by the machine. A policy server gathers information from the machines by polling the application-classifier plugin in each client and reading the collected statistics. Alternately, each client can periodically send the collected information to the policy server. The policy server can then make policy decisions and prioritize network traffic based on the information collected from the clients' application-classifier plugins.

Figure 5:
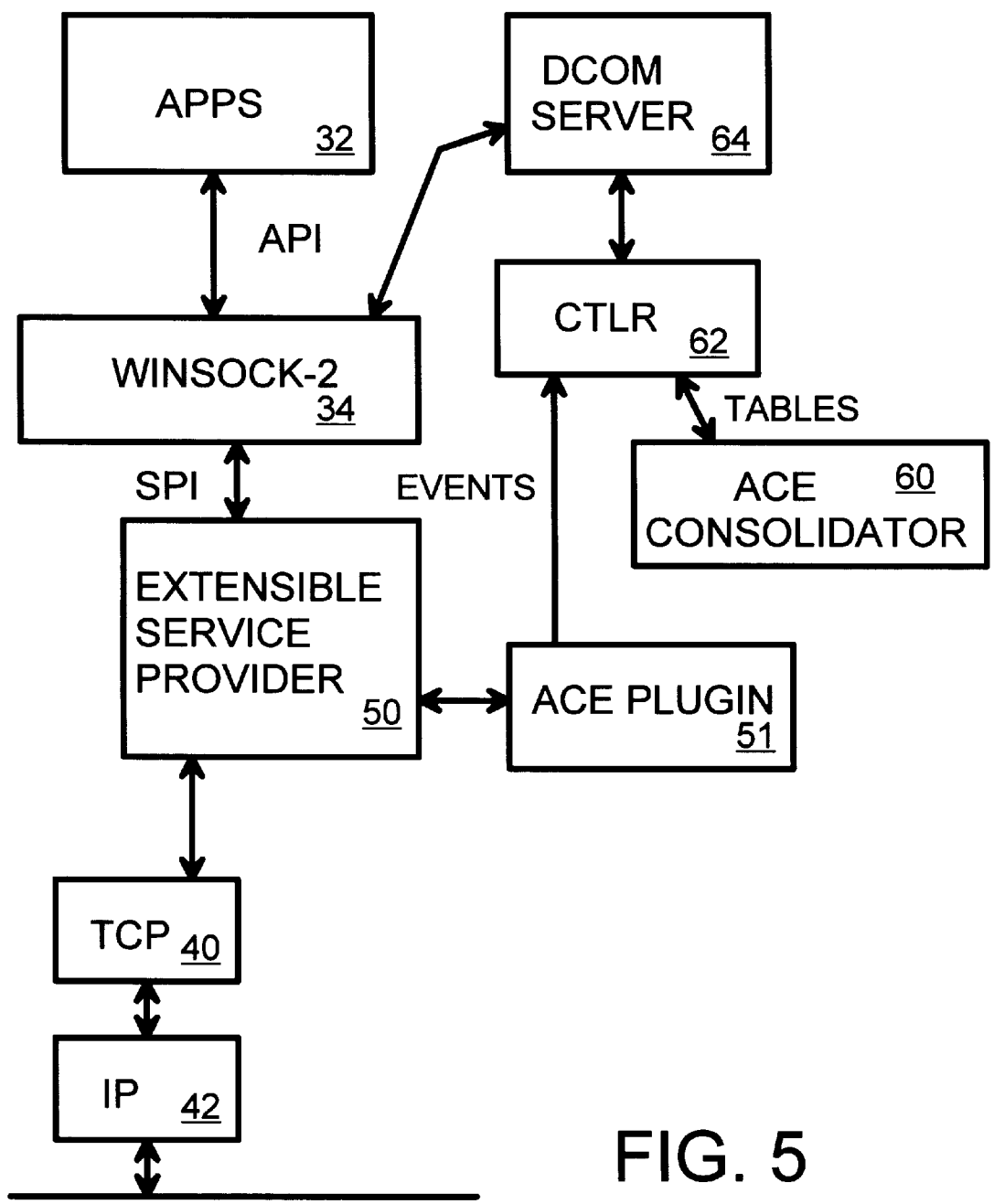
FIG. 5 is a diagram of an application-classifier that plugs into an extensible service provider for network services.

Application-Classifier Plugs Into Extensible Service Provider—FIG. 5

FIG. 5 is a diagram of an application-classifier that plugs into an extensible service provider for network services. High-level applications 32 send and receive information to a network by making calls to Winsock-2 library 34. These calls use an applications-programming interface (API) that defines the function calls and their syntax. Winsock-2 library 34 is a dynamic-link library (DLL) of these function calls and other network-support routines.

TCP layer 40 sends data to IP layer 42, which splits the data into Internet-Protocol IP packets and adds header information such as the source and destination IP address. IP layer 42 sends and receives these IP packets to the network media using physical layers such as a MAC adapter. Multiple high-level applications 32 can spawn multiple processes that use multiple stacks such as TCP/IP and other protocols (not shown).

Instead of having many layered providers communicating with each other and TCP layer 40, a single extensible service provider 50 is installed, as described in detail in the parent application. Extensible service provider 50 intercepts all network traffic at a lower level than the applications. Extensible service provider 50 fits between Winsock-2 library 34 and TCP layer 40, operating on data sent from Winsock-2 library 34 to TCP layer 40 for transmission. Extensible service provider 50 is "extensible" since it allows for the expansion of network services.

Extensible service provider 50 manages or controls the execution of additional network services provided by plugins. Plugins are reduced in size and complexity compared with layered service providers because overhead functions and filtering is performed for all plugins by extensible service provider 50.

Plugins provide various extra network services such as encryption, compression, security, proxies, or re-routing. These network services are transparent to high level applications 32 and can be activated for all applications using the network. Extensible service provider supplies a framework for managing and ordering a wide variety of plugin services.

One such plugin is application-classifier plugin 51. Other plugins (not shown) may also be installed and controlled by extensible service provider 50 and thus co-exist with application-classifier plugin 51. One or more filters can be performed by extensible service provider 50 to reduce the amount of traffic that activates application-classifier plugin 51. In the preferred embodiment no filters are used so that all network traffic activates application-classifier plugin 51. Thus network statistics are collected on all traffic passing through extensible service provider 50 to and from TCP layer 40.

Application-classifier plugin 51 is a Windows DLL that is loaded by extensible service provider 50 on initialization. Extensible service provider 50 reads a list of plugins to load from the Windows registry and loads all the listed plugins, including application-classifier plugin 51. When application-classifier plugin 51 is loaded, it attaches itself to one or more of the filters registered with extensible service provider 50. In the preferred embodiment, application-classifier plugin 51 attaches itself to a universal filter that activates application-classifier plugin 51 for all network traffic.

When an event occurs, such as a command or call from Winsock-2 library 34 or from TCP layer 40, or completion of network I/O, extensible service provider 50 compares the properties of the event to each of its filters and generates an event activating all plugins attached to matching filters.

Application-Classifier Components

When an event activates application-classifier plugin 51, a data object containing details of the event is sent to controller 62. Controller 62 classifies the event and updates tables maintained by application-classifier-engine (ACE) consolidator 60. Consolidator 60 keeps tables of the most-recent events for each application and process, but also keeps historical tables of past events, even for applications that have closed their connections and sockets. Statistical fields in the tables are also updated, such as the number of bytes sent by an application or any of its processes, and timestamps when connections were opened and closed.

A remote policy server can access the tables stored by consolidator 60 by connecting with DCOM server 64. DCOM server 64 contains proxy and stub objects that hide the details of network communication from higher-level application programs. DCOM server 64 uses Microsoft's Distributed-Component-Object Model (DCOM) of distributed programming objects. Winsock-2 library 34 receives calls from DCOM server 64 that send and receive data packets over the network, passing down the protocol stack through TCP layer 40 and IP layer 41. When a remote policy server connects as a client to DCOM server 64, a request can be sent from the remote policy server, over the network to controller 62. The request can instruct controller 62 to fetch one or more of the tables stored by consolidator 60 and send them back over the network to the policy server. Controller 62 and DCOM server 64 can be combined into a single controller module.

Real-time information may also be collected by a remote policy server. The policy server can register with controller 62 for certain kinds of events. For example, a policy server may need to know when a certain high-priority, high-bandwidth application such as videoconferencing opens a connection. The policy server can send the registration request through DCOM server 64 to controller 62. Whenever a connection for the high-priority videoconferencing application is opened and the event received by application-classifier plugin 51, controller 62, on receiving the event object from application-classifier plugin 51, sends the event object to DCOM server 64 to be immediately sent over the network to the policy server. The policy server can then reserve bandwidth for the videoconferencing application's packets before they arrive.

Objects Generated by Application-Classifier Plugin for Events—FIG. 6

FIG. 6 is a table of events that trigger the application-classifier plugin to send data objects to the ACE controller for classification. Events are generated by the Winsock-2 library when an application starts or ends, when it opens or closes a socket, when the connection state of the socket changed, and when data is sent or received.

Events can be grouped into three categories. Application events occur when a high-level networking application on the client machine opens or closes. Socket events are generated when a socket is opened, closed, changes its connection state, or the data is sent or received. A flow event occurs when a datastream begins or ends.

FIG. 6 shows that the EventAppStart object is generated by the application-classifier plugin when an application startup event occurs. A startup event is signaled by the extensible service provider by activating the application-classifier plugin at the StartUp entry point. The EventAppStop object is generated when an application cleanup event occurs, such as when the extensible service provider activates the application-classifier plugin at the Cleanup entry point. The application starting up or cleaning up makes a Winsock-2 API call, which is passed down to the extensible service provider which generates the proper entry point into the application-classifier plugin.

Either the AppStart or the AppStop object generated by the application-classifier plugin is sent to the ACE controller. The AppStart and AppStop objects use the EventAppInit data-object definition, shown in FIG. 7A.

Several different kinds of socket events can occur. The SocketOpen, SocketClose, SocketBind, SocketAccept, and SocketConnect objects are generated by the application-classifier plugin when one of the closely-named Winsock API functions is called. For example, when an application opens a socket with a WSASocket API call, Winsock-2 generates a WSPSocket SPI call to the extensible service provider, which activates the application-classifier plugin at the SocketOpen entry point. When the lower-level TCP layer determines that the connection with the remote machine has been made, the ConnectComplete event is generated.

Different kinds of objects are generated for socket events. The EventSocketInit data-object definition (FIG. 7B) is used to generate the SocketOpen and SocketClose objects sent to the ACE controller, while the EventSocketState data-object definition (FIG. 7C) is used to generate the SocketBind, SocketAccept, and SocketConnect objects when the socket state is changed and the BindComplete, AcceptComplete, and ConnectComplete events occur.

Completed data transfers signaled by the RecvComplete and SendComplete events generate the SocketIn and SocketOut objects, which are based on the EventSocketDataXfer data-object definition (FIG. 7D).

Flow events occur when a datastream completes. A flow is a connected TCP data stream or a sequence of unconnected (UDP) data-grams to and/or from a unique IP address and port. For TCP (connection oriented) steams, ConnectComplete signals the start of a flow in most cases. Some Winsock applications do not wait for completion of a connection: they simply initiate the connection and attempt to send or receive, assuming that data is transferred when the connection is made. In this special case, the triggering event for the flow is the combination of a ConnectComplete event and successful data transfer, signaled by RecvComplete and SendComplete events.

For unconnected UDP data-grams, the first data successfully sent or received from a unique IP address and TCP/UDP port defines the start of a flow. This is indicated by the RecvComplete and SendComplete events that generate the Socketin and SocketOut objects.

When the flow begins, either the ConnectComplete event for TCP or the RecvComplete and SendComplete events for UDP, the FlowStart object is generated, based on the EventFlowInit data-object definition (FIG. 7E). The end of the flow is signaled by the SocketClose event, which generates a FlowStop object also based on the EventFlowInit data-object definition 89.

Data Objects—FIGS. 7A–7E

FIGS. 7A–7E show definitions for objects that transfer data about network events from the application-classifier plugin to the ACE controller for classification and storage. The triggering events for these objects were shown in FIG. 6. Each of the tables in FIGS. 7A–7E and 9A, 9B describe array data objects that are transferred.

FIG. 7A shows the EventAppInit data-object definition. A version number is the first parameter in the definition. A timestamp is stored for the time that the event activated the application-classifier plugin. The unique process ID for the Winsock process that originated the event is stored in the ProcessID field. One application can spawn several network processes, but each process is identified by a unique ID assigned by the Windows operating system.

The name of the high-level application is retrieved using the Win32 API library call GetModuleFileName. Thus the objects based on EventAppInit data-object definition include the names of the application, user, and host, as well as a timestamp and the unique process ID.

FIG. 7B shows the EventSocketInit data-object definition. A version number, timestamp, and the unique process ID are stored. The socket handle and the network-layer (IP, IPX) and transport-layer (TCP or UDP) protocols are also stored.

The application and user names are not contained in the socket objects since the unique process ID can be used to associate the information with the corresponding application and user. An event created by the process such as a StartUp event contained the application and user names. Thus the consolidator already has the association of the unique process ID to the application before any socket events occur.

FIG. 7C shows the EventSocketState data-object definition. A version number, object timestamp, and the unique process ID are stored. The socket parameter is the value of the socket handle assigned by the Winsock library. The local and remote addresses are also stored. These are the destination and source IP addresses and TCP/UDP ports. For SocketBind objects, the remote address is not yet known and the remote address field is set to zero.

The EventSocketDataXfer data-object definition is shown in FIG. 7D. Again, a version number, timestamp, and the unique process ID are stored. The socket address and the local and remote addresses are also stored. The number of bytes in the transfer is also stored in the Bytes parameter. The number of bytes transferred is a useful statistic, since the policy server can use it to determine the bandwidth used by the application. Bandwidth hogs can thus be identified.

FIG. 7E highlights the EventFlowInit data-object definition. Flows are sequences of data packets sent or received between two endpoints. The version number, timestamp, and the unique process ID are stored. A unique flow ID that was assigned by the ACE plugin is also stored, since each process can generate several flows.

The transport-layer and network-layer protocols are stored in the flow object. The source and destination IP addresses and TCP/UDP ports are also stored in the object.

Figure 8:
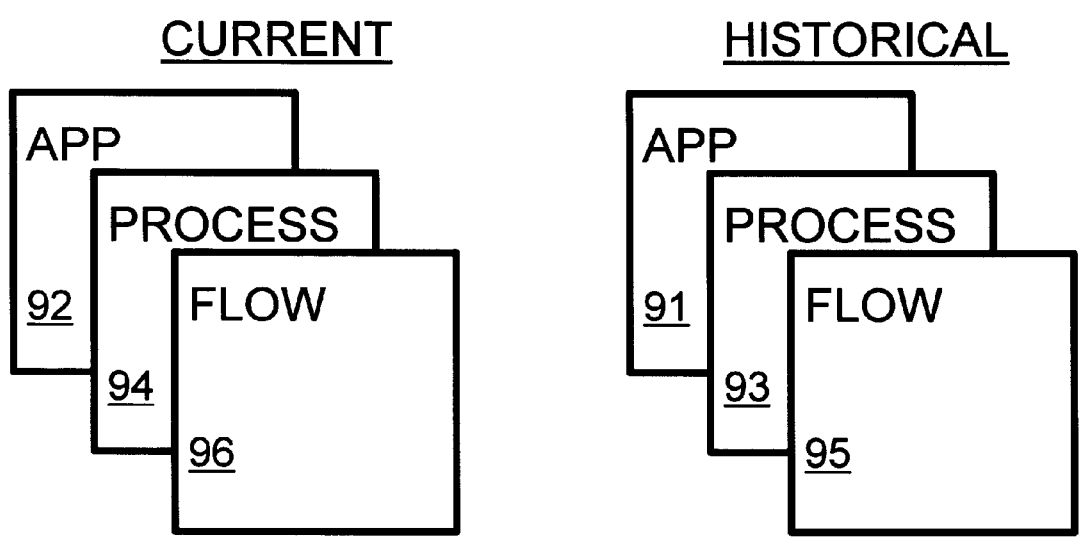
FIG. 8 shows the current and historical tables of network events maintained by the application-classifier consolidator.

Current and Historical Tables in Consolidator—
FIG. 8

FIG. 8 shows the current and historical tables of network events maintained by the application-classifier consolidator. Statistical data stored in the tables include overall byte counts of data sent or received, average and maximum bytes sent/received per second, and start and stop timestamps of processes and flows.

Current tables 92, 94, 96 are snapshots of currently-running applications, processes, and flows. When a flow, process, or application closes, its table entry is deleted from the current tables. Thus a policy server reading current tables 92, 94, 96 might not see statistics for applications or flows that recently closed.

Historical tables 91, 93, 95 contain entries for both running and closed applications, processes, and flows. Historical tables 91, 93, 95 can contain only a limited number of entries; once the limit is reached, the oldest entry of all the applications, processes, or flows is deleted to make room for a new entry. Flow historical table 95 is more likely to fill up before process historical table 93 or application historical table 91, since a single application can generate several processes, and each process can generate many flows. Of course, the sizes of the tables can be adjusted to allow more room for flow table 95 and process table 93 than for application table 91.

Application tables 91, 92 each contain no more than one entry for each application. Network statistics are consolidated into the single entry for all processes and flows for the application. Thus a policy server can read an entry for a specific application to find out how many bytes the application has sent or received, regardless of how many connections have been made for the application. This allows high-bandwidth applications to be quickly identified. If two or more instances of an application are running, their network statistics are combined into a single entry in application table 92. Thus if a user as multiple browser windows running, the total browser traffic can be found in application table 92. Likewise, when an application is closed and restarted, a running total statistic for all previous instances of the application is kept. Restarting the application thus does not reset the usage statistics.

A finer granularity to network statistics is stored by process ID in process tables 93, 94. Each unique process ID contains one entry per table. When another instance of an application is started, a second process ID is assigned to it, and a second entry is created in process table 93. When an application is closed and later restarted, the restarted application has a different process ID than the application did before it was closed. Separate entries are stored in historical process table 93, although only the running processes have an entry in current process table 94.

Flow tables 95, 96 provide the finest granularity of network statistics. Each unique flow has its own entry. Different flow ID's are assigned to each flow generated by an application. Their entries are placed into historical flow table 95.

Storage space can be reduced when the consolidator stores only flow tables 95, 96. When the policy server or ACE controller reads an entry in the application or process tables, the entry can be generated on the fly by the consolidator. All flow-table entries for the requested process or application are read, and their entries merged. Byte counts are summed, and average and maximum transfer rates and start and stop times are calculated for the process or application. Since table queries are less frequent than updates, overall processing is reduced by storing just the finest-granularity tables and generating the coarser-table entries.

Consolidator Table Entries—FIGS. 9A, B

FIGS. 9A, 9B are tables of the format of an entry in the consolidator's tables. Again, a version number, the unique process ID and the flow ID are stored. For application entries, the most-recent process ID and most-recent flow ID are stored. Process entries store the most-recent flow ID. The application and user names stored at the end of the entry allow the application and user names to be found. The start and stop times of applications, processes, or flows are stored in historical tables. For current tables, the application, process, or flow has not yet terminated, so the stop time is set to zero. For historical tables, the stop time is the time the last process instance of the application or flow was terminated.

The transport protocol (TCP, UDP, etc.) is stored along with the source and destination IP addresses and TCP ports. For application and process tables, these are the addresses and protocols for the most-recent flow.

Statistical information, such as byte counts, is also stored. Separate fields store the total number of bytes sent and the total bytes received for the application, process, or flow. The maximum and the minimum number of bytes sent or received in any one-second period is stored in the MinRate and MaxRate fields. The average byte rate is stored as AvgRate.

A sample of the rate can be taken over a specified period. The number of bytes sent and received during the sample period is stored in DeltaBytesSent and DeltaBytesRecvd. The length of the sample period is stored as DeltaRate. In FIG. 9B, a flow table is shown. It contains an array of flows, with each flow as shown in FIG. 9A. All the flows on a machine can be counted using the flow table of FIG. 9B.

Figure 10:
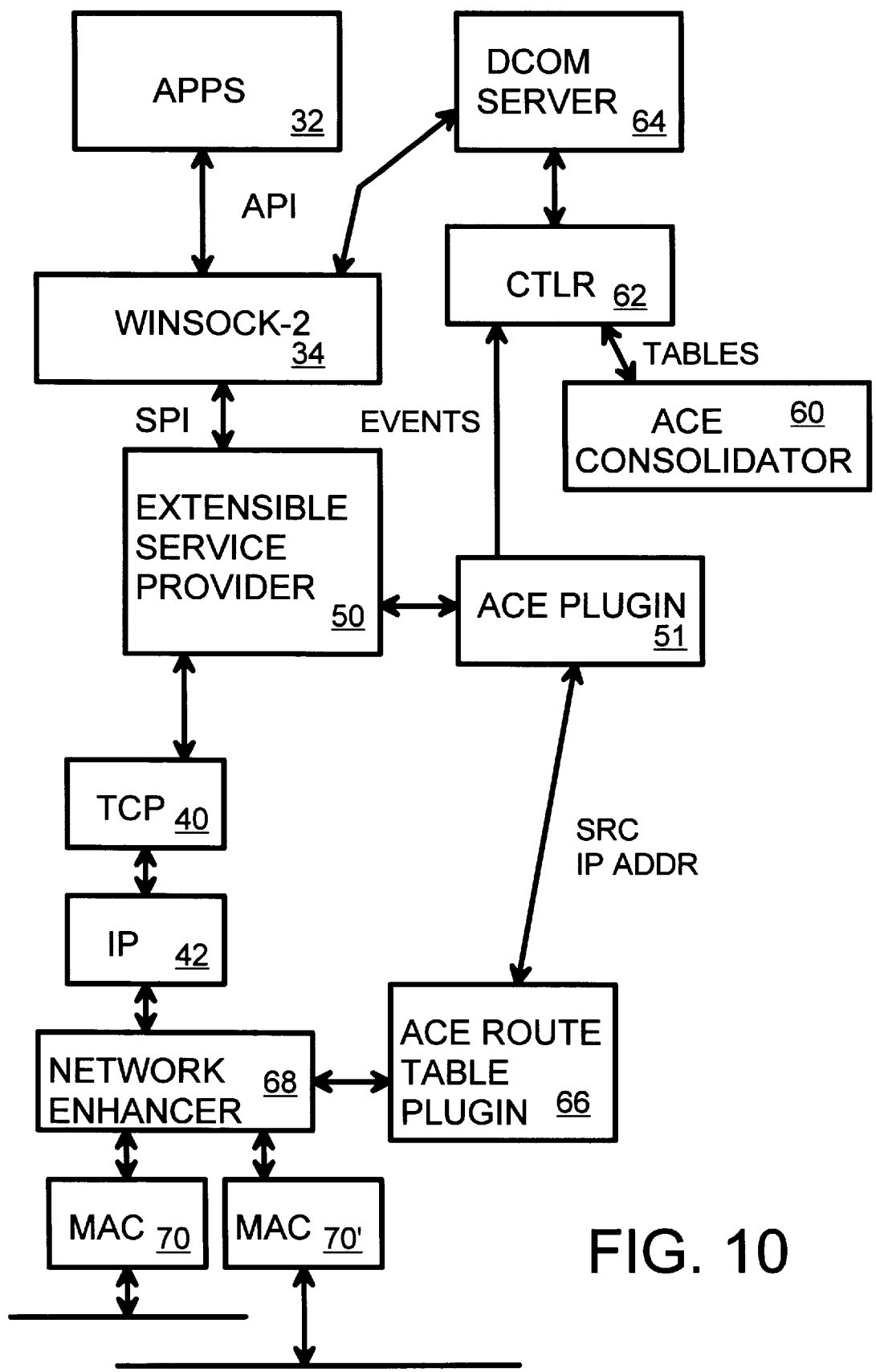
FIG. 10 illustrates dual-level application-classifier plugins when multiple network addresses are used by a client.

MAC-Level Route-Table Plugin—FIG. 10

FIG. 10 illustrates dual-level application-classifier plugins when multiple network addresses are used by a client. Some client machines connect to more than one network. For example, the client machine may have two Ethernet LAN cards, or a Token-Ring and an Ethernet card, or a Ethernet card and a dial-up modem connection. Two IP addresses are assigned to the client machine. Packets from TCP/IP layers 40, 42 may be assigned either IP source address, depending on which network the data is sent out over. For unconnected UDP datagrams, Winsock is not notified by TCP/IP layers 40, 42 of which IP address is used. Thus application-classifier plugin 51 is not able to determine the source IP address for this special case.

Network enhancer 68 is a low-level network driver installed below IP layer 42 but above media-access-controller MAC drivers 70, 70'. MAC drivers 70, 70' are software drivers that transfer data to network adapter cards on the client machine and control the cards. Two different network connections are made by MAC drivers 70, 70', each using a different source IP address.

Network enhancer 68 is installed by the operating system as a low-level driver (a Network Device Interface Specification NDIS shim) that intercepts all outgoing and incoming network traffic. A filter is used by network enhancer 68 to intercept only ARP Address Resolution Protocol data that is sent prior to a datagram, since the ARP protocol specifies the destination and source IP addresses. The filter activates route-table plugin 66 when ARP traffic is detected. Route-table plugin 66 is a plugin module that receives the IP addresses from network enhancer 68. The destination and source IP addresses are captured by route-table plugin 66 and stored in a route table of source and destination IP addresses by route-table plugin 66.

When an unconnected datagram is sent through extensible service provider 50 to TCP/IP layers 40, 42, application-classifier plugin 51 queries route-table plugin 66 for the source IP address used by TCP/IP layers 40, 42.

Application-classifier plugin 51 then generates the event object using the source IP address obtained from route-table plugin 66, and sends the event object to controller 62. Controller 62 classifies the event object and updates the application, process, or flow tables in ACE consolidator 60. A remote policy server can read the table objects of consolidator 60 through DCOM server 64 as described earlier.

Application-classifier plugin 51 queries route-table plugin 66 by performing a user-mode to kernel call. Such kernel calls can hurt performance. However, such a call is required only once for each new flow, and only for clients connected to two or more networks. An alternative is to store the route table in the Windows registry.

The inventors have recognized this unusual problem caused by Winsock-2 not providing the source IP address for unconnected datagrams. The problem is only apparent when two or more network adapters are connected to a system. Dropping prices of network adapter cards and use of modems may make dual-network systems more common in the future.

Figure 11:
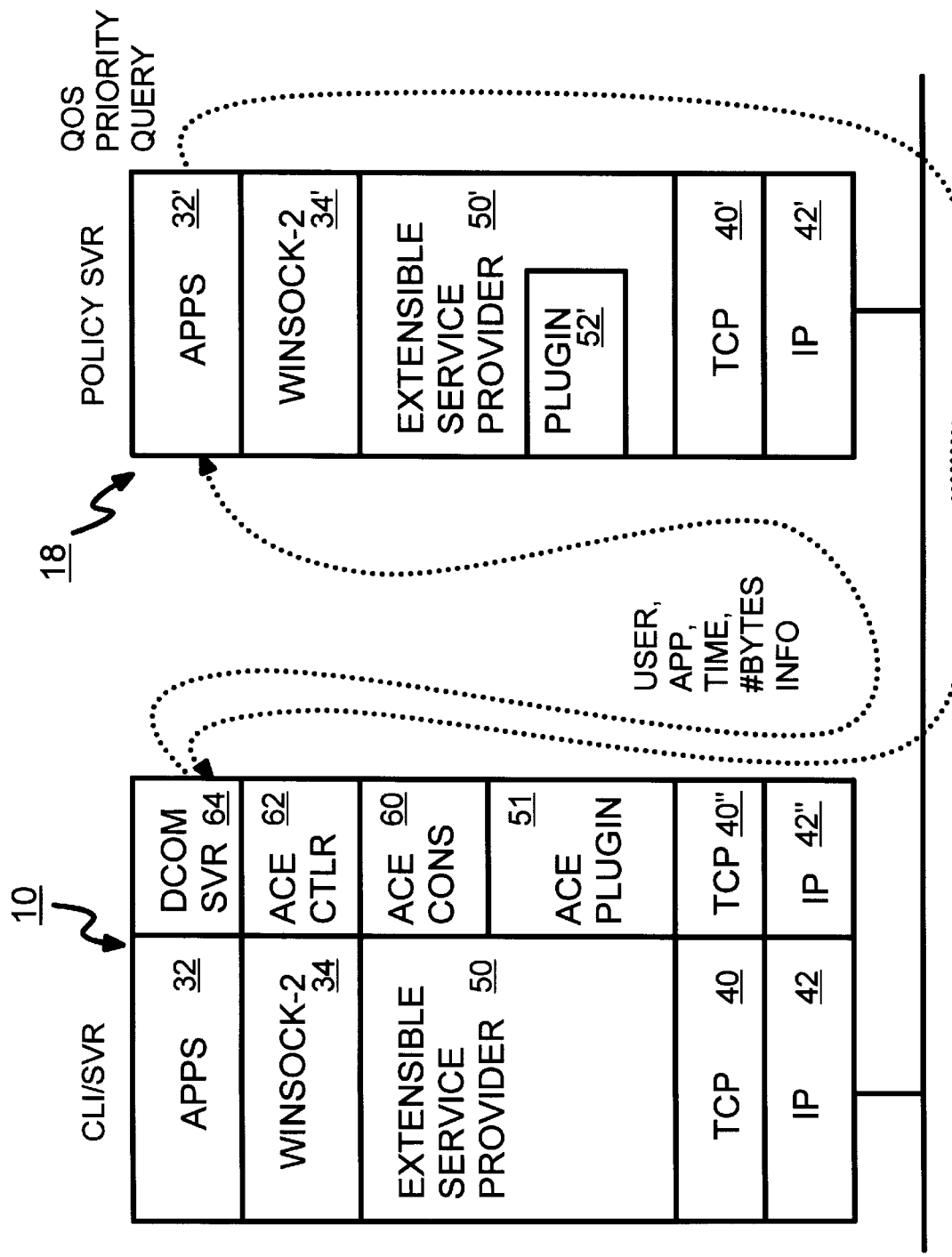
FIG. 11 shows how the application-classifier plugin is useful for providing information for policy control applications in a policy server.

Plugins Useful for Policy Control—FIG. 11

FIG. 11 shows how the application-classifier plugin is useful for providing information for policy control applications in a policy server. The application-classifier plugin can periodically send the collected statistics to a server by creating network calls to send packets containing the statistics. The application-classifier plugin is transparent to higher-level applications since it operates between the Winsock-DLL called by the applications and the lower-level TCP/IP stack.

Policy control is implemented by policy server 18, which collects detailed statistics of network traffic from various network nodes such as client 10. High-level applications 32 in client 10 include www browsers, corporate database viewers and data-entry terminal apps, and workgroup apps such as network-enabled word processors and spreadsheets and other editors. Winsock-2 library receives calls from applications 32 for access to the network. These calls are passed down to extensible service provider 50, which filters these calls and executes one or more plugins.

Application-classifier plugin 51 intercepts and analyzes the network traffic from client 10. The analyzed or modified data from application-classifier plugin 51 is sent back to extensible service provider 50 and sent down through TCP layer 40 and IP layer 42 and finally out over the network.

Each event, such as opening or closing a socket, making or breaking a connection, or transferring data packets is intercepted by application-classifier plugin 51. The event is analyzed and classified by application-classifier controller 62, which updates tables in application-classifier consolidator 60. Thus statistics on network traffic from client 10 are stored in the tables of application-classifier consolidator 60.

The Winsock-2 API is provided for use by the plugins. This API is useful for allowing the plugins to communicate with remote servers such as the policy server. For example, application-classifier controller 62 can use Winsock calls to send ("push") data over the network using TCP layer 40" and IP layer 42".

Policy server 18 may observe some packets from client 10, but does not know what priority to assign to them. A policy application 32 can make a call to Winsock-2 library 34' that is sent through extensible service provider 50', TCP layer 40', and IP layer 42' to client 10 over the network. This call can be directed to DCOM server 64 in client 10, asking what kind of traffic was recently sent. DCOM server 64 reads the tables in application-classifier consolidator 60 to obtain the desired information. DCOM server 64 then responds to policy server 18 by sending the desired information, such as a log of packets sent, together with their applications 32 that generated the packets and other high-level information that may not be contained in the packets sent.

Other information may be requested by policy server 18, such as the number of bytes sent by any particular application 32 on client 10, or the total number of packets sent in a time period. The highest burst rate of packets or the average packet transmission rate can also be obtained.

DCOM server 64 allows easier object-oriented programming techniques to be used, hiding the details of network communication from higher-level programmers. Stub and proxy objects are used on local and remote machines to facilitate communication over the network. Extensible service provider 50' on policy server 18 is not required and can be eliminated in some embodiments.

Thus policy server 18 is able to query client 10 by using application-classifier plugin 51, which analyzes and logs network traffic from client 10. More sophisticated schemes could have policy server 18 deciding that the traffic from client 10 is low-priority, and instructing application-classifier plugin 51 or another traffic-blocking plugin (not shown) to block traffic from a particular application 32 in client 10. Thus network traffic can be blocked from the source.

The policy enforcer (policy server) is able to identify the user and the high-level application of network packets by polling the application-classifier on the client machine. The IP address and TCP port are sent from the policy server to lookup the packet's user and application in the history tables kept by the application-classifier consolidator.

Plugins enable policy controls to be implemented in a manner transparent to higher-level applications. Plugins provide a way for network software to more closely examine network traffic from any machine, and even exert control over that machine's traffic.

Figure 12:
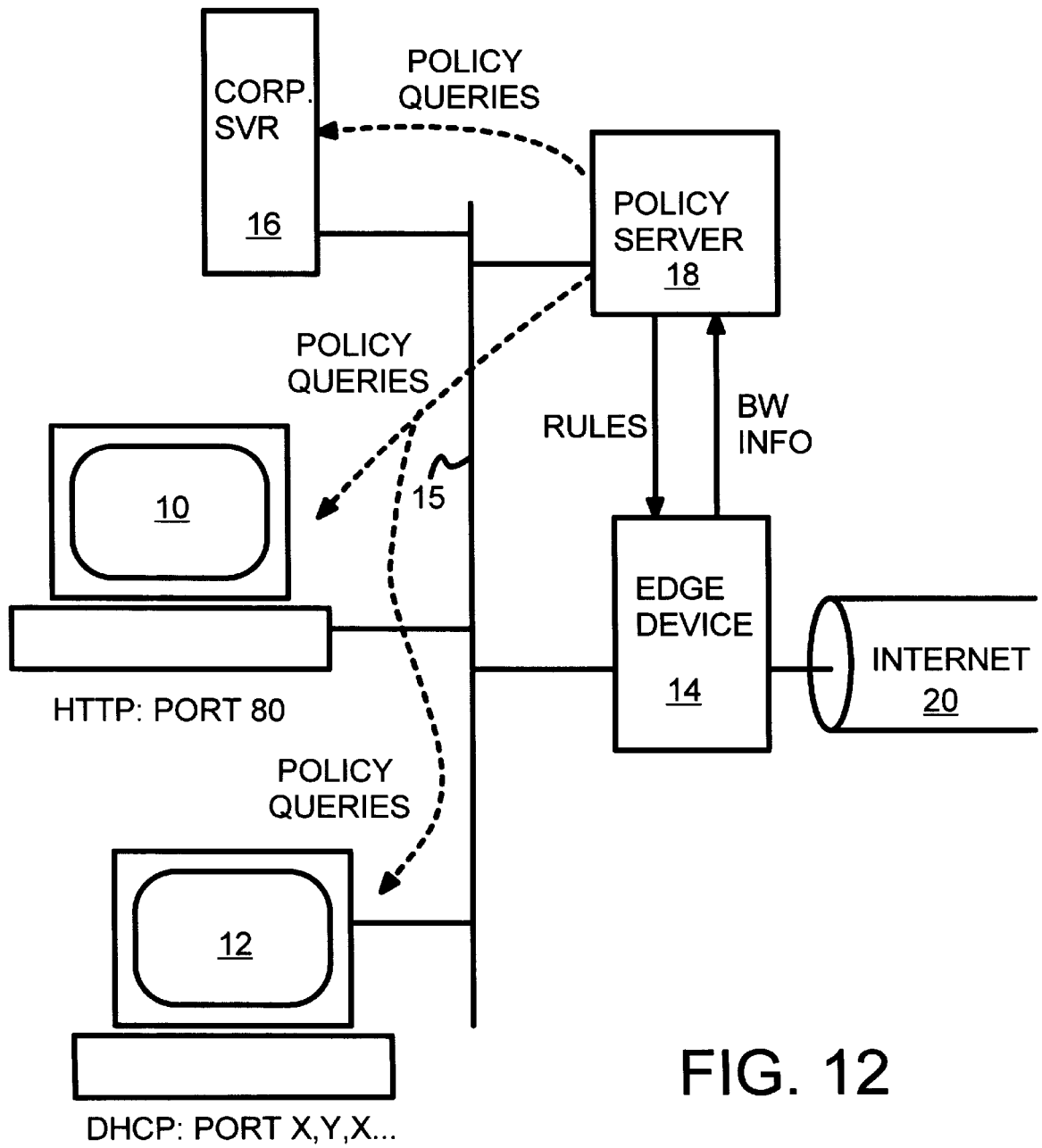
FIG. 12 is a diagram of a network using policy rules determined by queries of application-classifier plugins installed on clients.

Policy Server Queries Clients—FIG. 12

FIG. 12 is a diagram of a network using policy rules determined by queries of application-classifier plugins installed on clients. Policy server 18 queries application-classifier plugins installed on client PC's 10, 12, as described for FIG. 5. The DCOM servers on client PC's 10, 12 are used by policy server 18 to connect and read the ACE tables stored by the consolidators. Thus policy server 18 is able to determine which high-level application and which user is sending packets through edge device 14 by performing a lookup of the ACE tables on client PC's 10, 12 for the flow table having the source and destination IP addresses and TCP ports of the packets seen at edge device 14. The application and user names are stored with the matching entry in the flow table.

Policy server 18 can also find bandwidth-hogging applications by reading all historical application ACE tables on client PC's 10, 12, and comparing the average and maximum byte rate fields to acceptable thresholds. Applications with high transmission rates can be identified, and policy server 18 can instruct edge device 14 to block or delay packets for flows originating from these applications. The flows for an application can be read from the ACE tables.

Client PCs 10, 12 send IP packets over local network 15 to corporate server 16 and Internet 20. Edge device 14 is a router, switch, gateway, modem or other network device that connects local network 15 to Internet 20. Edge device 14 is able to block or delay packets to and from Internet 20 so that higher-priority packets experience less delay than lower-priority packets. Edge device 14 may examine packets and apply policy rules to determine which packets to accelerate and which to delay.

Policy server 18 can still send a policy query to corporate server 16, which may or may not have the application-classifier plugin installed. Corporate server 16 can respond that certain of its packets are high or low priority. Also, corporate server 16 may indicate if an IP address is high or low priority.

Low-priority web browsing from client 10 can be identified by finding the application name in the flow tables for the IP address for client 10 and port 80 used by the browser. Even dynamically assigns ports or IP addresses can be associated with their sending applications.

ADVANTAGES OF THE INVENTION

The names of the high-level application and its associated user on the client and on the server machines can be collected using the invention. The high-level application names then can be used for prioritizing IP packets from these applications, by associating the application name and its associated flows with traffic signatures. Thus network traffic is prioritized by user and application, rather than by machine. A user may have high priority when using corporate applications such as client databases and sales forms, but lower priority when using personal, non-business applications such as web browsing or graphics downloading.

Information can be collected from the client machines in a manner that is transparent to high-level client applications. Plugins installed on client machines can be queried by the policy server. A specialized application-classifier ACE plugin for the extensible service provider monitors and collects information on network traffic from a client. This information includes the originating and destination high-level applications, data rates, and users. Network traffic is prioritized based on high-level applications rather than low-level IP addresses and TCP ports.

The layered network architecture of the extensible service provider allows multiple third-party service providers to be installed in addition to the application-classifier ACE plugin. The Winsock-2 architecture is expanded for network services provided at a low level. These network services can transparently intercept network traffic. The complexity of layered providers is reduced and redundant filtering by each layered provider is eliminated by using the extensible service provider. An expandable system that manages, organizes, and orders low-level network service providers is attained. Plugins are executed in a functionally correct order even when many layered service provider plugins from different vendors are installed.

These plugins are simplified compared with Winsock-2 layered service providers, since overhead for communication with the Winsock-2 library and the TCP layer are handled by the extensible service provider. Since there are many Winsock-2 functions that are not used by most plugins, the overhead for these seldom-used functions is contained in the extensible service provider, reducing the complexity of the plugins. Complex I/O such as blocking, non-blocking via messages or events, and overlapped are handled by the ESP.

ALTERNATE EMBODIMENTS

Several other embodiments are contemplated by the inventors. For example, many software implementations using many different programming languages are possible. The invention may be adapted for UNIX and other operating systems, as well as future versions of Windows. Indeed, UNIX-DCOM servers are now appearing, allowing a UNIX policy server to access the application-classifier tables residing on a Windows machine. Rather than use distributed objects, the information can be sent using a management protocol such as SNMP or via FTP.

Edge devices may also be installed at internal points in a network, such as between sub-nets in a corporate Intranet. Many edge devices can be employed in a single network. Indeed, the invention can be applied to traffic within a local network or within an Intranet. One or more policy servers collect information from application-classifiers on clients or at intermediate points, and control these edge devices. Routers, bandwidth control boxes, switches, firewalls, and Virtual Private Networking (VPN) boxes, as well as Network Management systems can use need the information that the application-classifier can provide. These intermediate devices can be integrated with clients or servers using the invention.

Edge devices may not only limit traffic from certain applications identified by the application-classifier, but modify the traffic as well. For example, some applications may transmit confidential or sensitive information. The edge devices can encrypt packets for flows from such applications identified by the application-classifier. The application-classifier plugin itself, or another installed plugin can be used to block network traffic from the client, rather than the edge device. The policy server can program the plugin on the client machine to block packets from certain low-priority applications, or block after a threshold number of bytes have been sent in a time period. Thus network traffic can be blocked at the source, the client PC.

The invention can also be used for other classification purposes. Identifying application traffic enables security, access, routing, discard, and other tasks. Decisions can be made either remotely through a policy server or infrastructure device (gateway, router, bandwidth control device, or switch) or locally on the host system itself. In a very simple case, the invention can be used locally to effectively include the policy server on the same system. This approach might enable a user of a cable modem or DSL service to request a higher level of service from a network (and promise to pay accordingly). Usually, this selection of service would be done per application, e.g. if the user wanted to receive real time video, invoke IP telephony, or just get a file transferred more quickly.

Security applications can examine outgoing packets and encrypt packets only from certain applications, such as financial applications. Other applications from the same IP address, such as e-mail, can be skipped and sent out without encryption.

Other network-based, distributed-object programming standards besides DCOM can be substituted, such as CORBA or COPS. Future improvements to Winsock-2 can also be used with the invention. Earlier versions of Winsock communicated with both TCP and UDP, and UDP can be substituted for the TCP layer with the invention.

The invention has been described as filtering packets. However, data may not yet be divided into the final packets transmitted over the network media when intercepted by the extensible service provider. The data sent from the Winsock-2 library functions down to the extensible service provider and the TCP layer may be further divided by the TCP and IP layers into smaller packets for transmission. Thus the term "packets" when used for the extensible service provider do not strictly refer to the final transmitted packets, but to the data and header information that will eventually form one or more packets.

The invention can also work with other protocols such as SNA, IPX, X.25, etc. It is not restricted to IP (TCP, UDP, etc). The invention is extensible to perform more granular classification of traffic. For example, print and file transfer traffic may be mixed with interactive traffic sent from a single application. The invention can break these out into unique flows, identifying the traffic signatures for each 'subflow'. Two examples of this are tn3270 which combines terminal traffic, print traffic and file transfer traffic in a single telnet session, and a SAP/R3 application which has a variety of financial transaction types (including printing). The invention can provide extensions to identify the traffic signatures of individual transactions.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. A client-side application-classifier comprising:
   an upper interface to a higher-level network-socket library, the higher-level network-socket library for providing high-level network functions to high-level user applications by generating a socket for connecting to a remote machine on a network;
   a lower interface to a network-transport layer, the network-transport layer for formatting data for transmission over the network;
   an interceptor, coupled between the upper and lower interfaces, for intercepting network events;
   an examiner, coupled to the interceptor, for examining the network event intercepted and collecting statistical information about the network event, the statistical information including:
      an application name of one of the high-level user applications that caused the network event;
      a timestamp for the network event;
      a byte count when the network event is a transfer of data over the network;
      Internet addresses and ports when the network event is a connection or a data transfer; and
      a process identifier of a running instance of the high-level user application;
   a consolidator, coupled to the examiner, for consolidating the statistical information into application-classifier tables, the application-classifier tables including current tables for currently-running instances of applications, and historical tables that include closed applications; and
   a reporter, coupled to the consolidator, for sending the statistical information from the application-classifier tables to a remote policy server on the network, the statistical information including the application name, whereby the statistical information for network events is collected by the client-side application-classifier.

2. The client-side application-classifier of claim 1 wherein the interceptor is an extensible service provider and wherein the examiner is an application-classifier plugin to the extensible service provider, the extensible service provider for controlling other plugins providing low-level network services.

3. The client-side application-classifier of claim 1 wherein the examiner includes means for generating an event object containing the statistical information, the event object sent to the consolidator and written into the application-classifier tables.

4. The client-side application-classifier of claim 1 wherein the network event is selected from the group consisting of:
   an application startup event when a high-level application is initialized;
   an application cleanup event when the high-level application is terminated;
   a socket open event when a new socket is opened;
   a socket close event when a socket is closed;
   a connect event when a connection is made from a client to a remote server;
   an accept event when a connection is accepted from a remote client;
   a send-complete event when a flow of data has been sent from the client to the remote server; and a receive-complete event when a flow of data has been sent from the remote server to the client.

5. The client-side application-classifier of claim 4 wherein the statistical information for all network events includes a process identifier, wherein the application-classifier tables are indexed by the process identifier.

6. The client-side application-classifier of claim 5 wherein the application-classifier tables store for each flow of each high-level application:

the process identifier;

the timestamp;

the application name;

the byte count when the network event is a transfer of data over the network; and Internet addresses and ports when the network event is a connection or a data transfer;

and wherein an application-classifier table for a high-level application contains:

maximum, average, and most-recent data-transfer rates for flows generated by the high-level application.

7. The client-side application-classifier of claim 1 wherein the network-transport layer is a TCP/IP stack coupled to a first network through a first media-access controller and coupled to a second network through a second media-access controller, the client-side application-classifier further comprising:

a network enhancer, coupled between the network-transport layer and the first and second media-access controllers, for intercepting network packets and extracting routing information including source and destination network addresses; and a route table, coupled to the network enhancer, for storing the routing information for the network packets;

the examiner coupled to the route table to determine a source address of either the first media-access controller or of the second media-access controller when the source address is not available from the upper interface, whereby source addresses for clients with two network connections is obtained by the network enhancer below the TCP/IP stack.

8. A computer-implemented method for classifying network flows from a client, the method comprising:

calling a socket function for opening or transmitting data through a socket-connection for connecting a high-level application to a remote machine on a network, the socket function being a function in an applications-programming interface (API) used by high-level applications to access the network;

activating an extensible service provider before the data is sent from the socket function to a lower network-transport layer, wherein the data is intercepted by the extensible service provider, the extensible service provider for evaluating filters to determine which plugins need to be executed;

activating an application-classifier plugin attached to the extensible service provider before the data is sent to the network-transport layer;

collecting statistical information including a name of the high-level application generating the data, a user name, a timestamp, and a number of bytes transmitted when the application-classifier plugin is activated;

consolidating the statistical information collected by the application-classifier plugin in application-classifier tables; and sending the statistical information to a policy server on a remote machine on the network, wherein the policy server prioritizes the data using the name of the high-level application obtained from the application-classifier plugin on the client, whereby the policy server prioritizes network data based on names of high-level applications obtained from the application-classifier plugin on the client.

9. The computer-implemented method of claim 8 wherein the step of sending the statistical information comprises:

searching the application-classifier tables for matching entries having a source and a destination IP address that match a source and a destination IP address that the policy server obtained by examining a network packet, the network packet not containing the name of the high-level application; and reading the name of the application from the matching entries and sending the name of the high-level application to the policy server as the high-level application that generated the network packet examined by the policy server, wherein the policy server prioritizes network traffic based on high-level applications rather than low-level IP addresses.

10. The computer-implemented method of claim 9 further comprising:

generating an event object when the application-classifier plugin is activated, the event object indicating a type of network activity performed by the socket function, the event object containing the statistical information;

sending the event object to the application-classifier tables, the statistical information being added to the application-classifier tables.

11. The computer-implemented method of claim 10 further comprising:

finding bandwidth-hogging applications by reading byte-count fields in the application-classifier tables and comparing the byte-count fields to a threshold, wherein applications with network flows having byte-counts above the threshold are identified as high-bandwidth applications.

12. The computer-implemented method of claim 11 further comprising:

using the timestamp in the statistical information and the number of byte transmitted to determine a rate of byte transfer;

storing the rate of byte transfer in the application-classifier tables.

13. The computer-implemented method of claim 8 wherein the application-classifier plugin is transparent to high-level applications, the application-classifier plugin performing low-level network services.

14. A computer-program product comprising:

a computer-usable medium having computer-readable program code means embodied therein for classifying network traffic according to high-level application name, the computer-readable program code means in the computer-program product comprising:

socket means for receiving data for transmission over a network, the data from a high-level application that uses a high-level library of socket-functions for sending the data to the socket means;

transport means for sending the data to a lower-level network-transport layer, the lower-level network-transport layer for formatting the data for transmission over the network; and extensible service provider means, coupled to the socket means and to the transport means, for activating a application-classifier plugin when the data is sent to the transport means, the extensible service provider means further for activating other plugins;

the application-classifier plugin including means for collecting information about the data, the information including a name of the high-level application generating the data, a source address and a destination address, and a timestamp;

whereby the data is classified by the name of the high-level application generating the data sent to the network.

15. The computer-program product of claim 14 wherein the computer-readable program code means further comprises:

a consolidator, coupled to the application-classifier plugin, for storing the information collected in application-classifier tables with information collected for network data transmissions for other high-level applications, whereby the information is stored in the application-classifier tables.

16. The computer-program product of claim 15 wherein the computer-readable program code means further comprises:

reporting means, coupled to the consolidator, for receiving requests from a policy server on a remote machine on the network, for reading the application-classifier tables and returning to the policy server the name of the high-level application from the application-classifier tables, whereby the policy server looks up the name of the high-level application sending the data to the network.

17. The computer-program product of claim 16 wherein the request from the policy server includes source and destination IP addresses from data packets sent over the network from the socket means, but the data packets do not contain the name of the high-level application sending the data, whereby the policy server cannot obtain the name of the high-level application from the data packets but only from the application-classifier tables.

18. The computer-program product of claim 16 wherein the computer-readable program code means further comprises:

filtering means for comparing transmission information for the data from the socket means to predetermined transmission criteria, for indicating when a socket matches the predetermined transmission criteria;

wherein the extensible service provider means only activates the application-classifier plugin when the socket matches the predetermined transmission criteria.

19. The computer-program product of claim 18 wherein the computer-readable program code means further comprises:

a blocking plugin, coupled to the extensible service provider means, for blocking the data from being transmitted to the network;

wherein the policy server determines which data is low-priority data by reading the names of high-level applications from the application-classifier tables;

wherein the blocking plugin blocks low-priority data from being transmitted on the network to reduce network traffic, the blocking plugin under control of the policy server, whereby the low-priority data is blocked at the source before being sent over the network.

20. The computer-program product of claim 16 wherein the application-classifier plugin and extensible service provider means are installed on a client machine, whereby the client machine collects the information for use by the policy server.

* * * * *